United States Patent [19]

Wonsetler

[11] Patent Number: 5,511,764
[45] Date of Patent: Apr. 30, 1996

[54] SELF-EXHAUSTING WELDING STATION

[75] Inventor: Charles M. Wonsetler, Larned, Kans.

[73] Assignee: A. A. Doerr Mercantile Co., Larned, Kans.

[21] Appl. No.: 346,074

[22] Filed: Nov. 29, 1994

[51] Int. Cl.[6] .................................................. B23K 7/08
[52] U.S. Cl. ......................... 266/49; 55/DIG. 18; 266/48
[58] Field of Search ............................... 266/48, 49, 65; 148/194, 195; 55/305, DIG. 18; 454/49, 63, 66

[56] References Cited

U.S. PATENT DOCUMENTS

| | | | |
|---|---|---|---|
| 3,295,298 | 1/1967 | Mackey | 55/305 |
| 3,701,514 | 10/1972 | Walters et al. | 266/48 |
| 3,944,405 | 3/1976 | van Caisteren et al. | 55/338 |
| 4,176,828 | 12/1979 | Lange | 266/65 |
| 4,202,676 | 5/1980 | Pelosi, Jr. et al. | 55/269 |
| 4,252,054 | 2/1981 | Bakels | 55/385 A |
| 4,255,169 | 3/1981 | Leliaert et al. | 55/DIG. 18 |
| 4,333,745 | 6/1982 | Zeanwick | 55/DIG. 18 |
| 4,606,260 | 8/1986 | Cox | 55/DIG. 18 |
| 4,647,295 | 3/1987 | Christ | 55/DIG. 18 |
| 4,947,510 | 8/1990 | English | 15/310 |

OTHER PUBLICATIONS

CHAFCO brochure, Mar. 15, 1967.

*Primary Examiner*—Scott Kastler
*Attorney, Agent, or Firm*—Litman, McMahon and Brown

[57] ABSTRACT

A self-exhausting welding station includes a frame assembly with a generally rectangular platform frame mounted on legs. An exhaust system includes a filter cabinet mounted on the platform frame and including a series of filter panels which can be successively finer. A motorized fan is connected to a downstream side of the filter cabinet in communication with an outlet opening thereof for drawing an air flow through the filter cabinet and the filters mounted therein. A work area assembly is placed on top of the frame assembly over the filter cabinet and includes a work surface with slot perforations through which exhaust from welding operations and the like can be drawn downwardly by the exhaust system for passage through the filter cabinet wherein the exhaust gas is filtered prior to discharge.

1 Claim, 2 Drawing Sheets

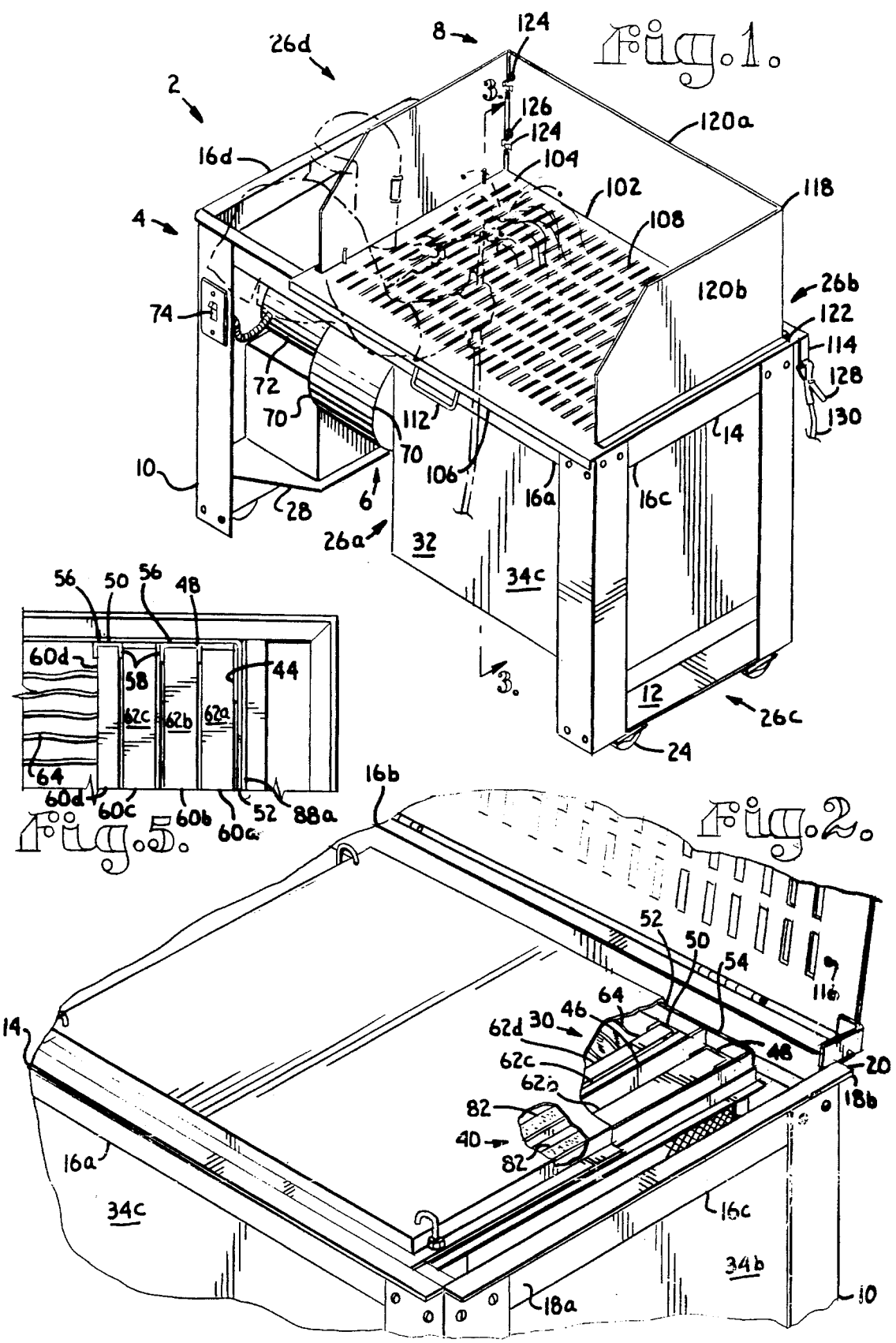

SELF-EXHAUSTING WELDING STATION

BACKGROUND OF THE INVENTION

1. Field of the Invention

The present invention relates generally to exhaust gas control and filtering, and in particular to a self-exhausting welding station.

2. Description of the Related Art

Various types of manufacturing and fabrication procedures generate exhaust fumes, airborne particulate matter, sparks and the like. Such exhaust is at best annoying to people in proximity to the operations generating same. At worst it can pose serious problems involving possible injury or damage to exposed persons and property.

A possible solution to exhaust problems is to ventilate those areas where such operations take place. However, adequate ventilation for a welding operation or the like may require mechanical equipment capable of moving large volumes of air to achieve the necessary frequency of air changes. Such equipment can, of course, represent a significant expenditure both in terms of initial and ongoing operating expenses.

Previous devices for controlling the exhaust from welding operations and the like have included the down-flow chamber shown in the Van Caisteren et al. U.S. Pat. No. 3,944,405 and the flame cutting arrangement shown in the Lange U.S. Pat. No. 4,176,828. However, such previous devices have generally tended to be relatively limited in their applications, prohibitively expensive and/or unsuitable for general purpose welding and similar operations. Moreover, many such previous devices were not adapted for employing readily available filter screens.

Previously there has not been available a self-exhausting welding station with the advantages and features of the present invention.

SUMMARY OF THE INVENTION

In the practice of the present invention, a self-exhausting welding station is provided which includes a frame assembly having legs supporting a platform frame, an exhaust system having a filter cabinet with multiple filters mounted therein and a motorized fan for drawing an air flow therethrough. Exhaust from welding operations and similar procedures is drawn through successively finer filters for removing particulate matter therefrom and drawing smoke and fumes away from an operator.

A work area assembly is mounted on top of the cabinet and includes a work surface with slot perforations which allow exhaust, smoke and fumes from a welding or other similar operation to be drawn downwardly through the work surface and through the filter cabinet.

OBJECTS AND ADVANTAGES OF THE INVENTION

The principle objects and advantages of the present invention include: providing a self-exhausting welding station; providing such a welding station which includes a self-contained exhaust system; providing such a welding station which includes a multi-stage filter system; providing such a welding station which provides progressive filtering of exhaust, smoke and fumes from welding and similar operations; providing such a welding station which includes a work area assembly with a welding shield subassembly; providing such a welding station which is portable; providing such a welding station which is adapted for use in connection with various types of welding and other operations; and providing such a welding station which is economical to manufacture, efficient in operation and particularly well adapted for the purposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is an upper, front, right side perspective view of a self-exhausting welding station embodying the present invention.

FIG. 2 is an enlarged, fragmentary, upper front right side perspective view thereof with portions broken away to reveal internal construction and showing a work surface in an open position thereof.

FIG. 5 is a fragmentary, horizontal cross-sectional view thereof, taken generally along line 5—5 in FIG. 3.

DETAILED DESCRIPTION OF THE PREFERRED EMBODIMENTS

I. Introduction and Environment

Figure 3:
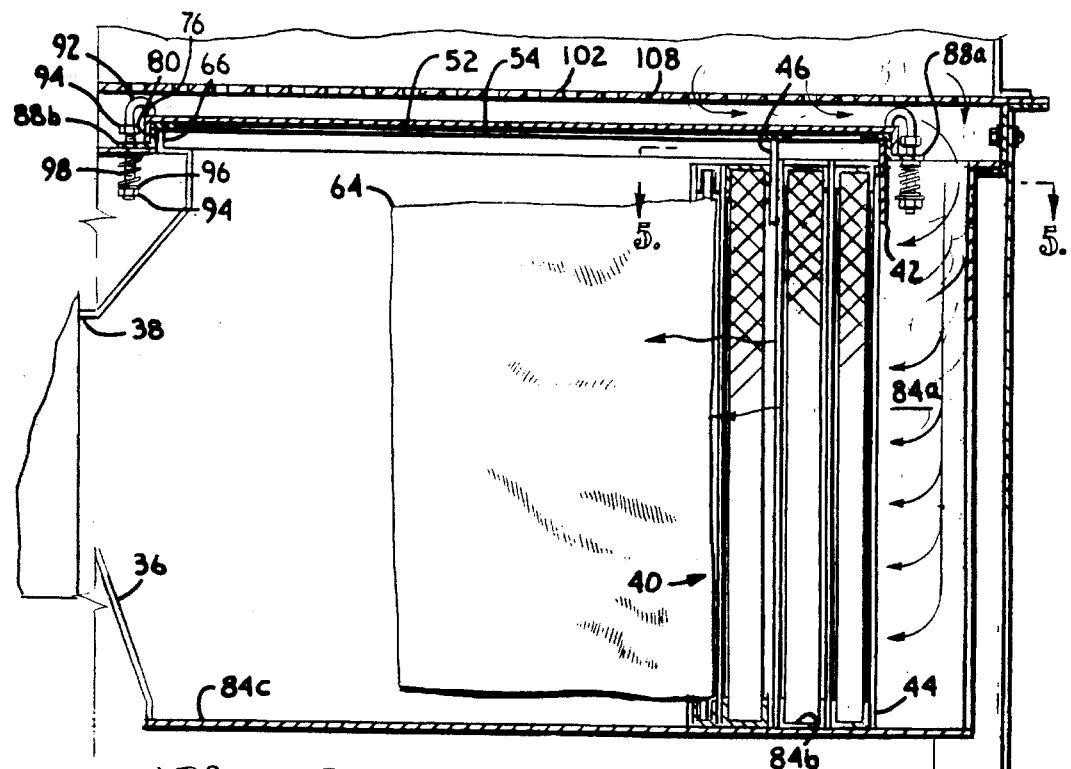
FIG. 3 is a fragmentary, vertical, cross-sectional view thereof taken generally along line 3—3 in FIG. 1 and particularly showing a filter system thereof.
Figure 4:
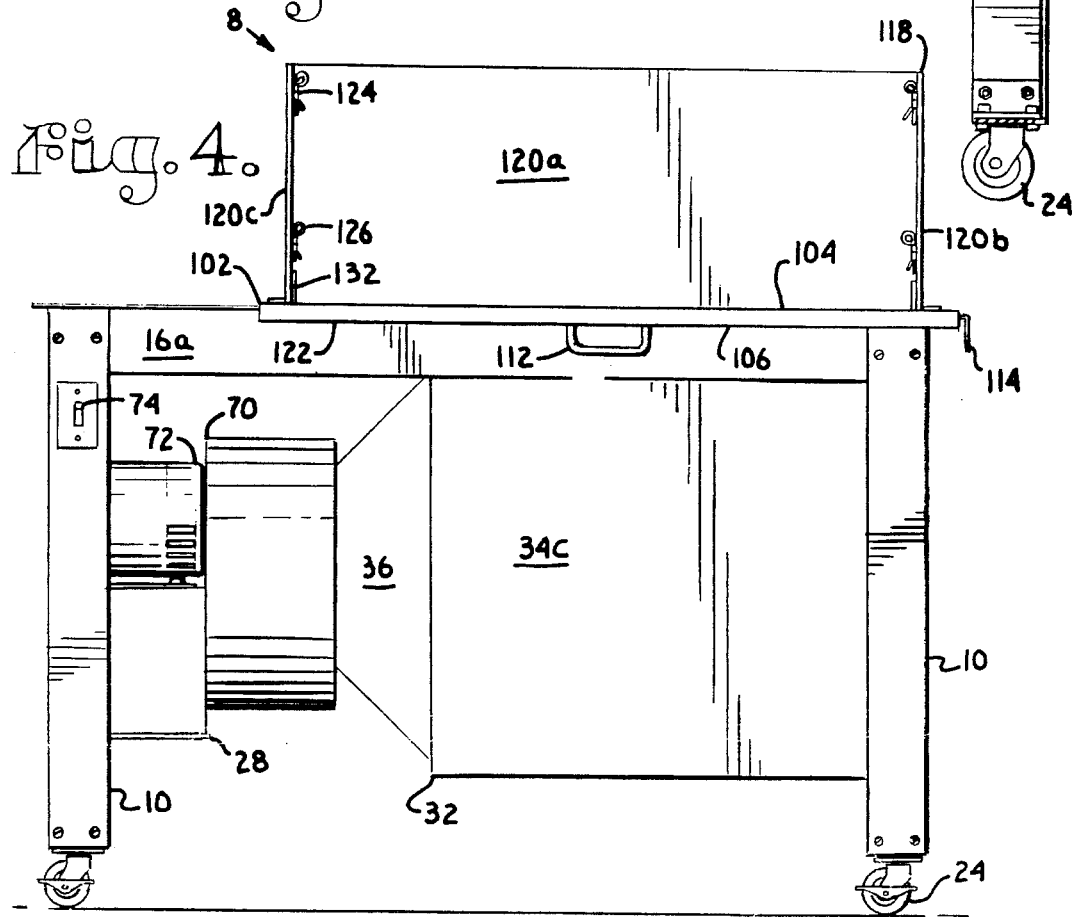
FIG. 4 is a front elevational view thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 2 generally designates a self-exhausting welding station embodying the present invention. The welding station 2 generally comprises a frame assembly 4, an exhaust system 6 and a work area assembly 8. The welding station 2 has a front 26a, a back 26b, a right/upstream side 26c and a left/downstream side 26d.

II. Frame Assembly 4

The frame assembly 4 includes four upright legs 10 and a pair of horizontal base members 12 each connecting a respective pair of legs 10 at the lower ends thereof at a respective side of the frame assembly 4. The legs and base members 12 can comprise various suitable structural members, such as the angle members shown.

A platform frame 14 is mounted on the upper ends of the legs 10 and includes front and back sections 16a, 16b and upstream/right and downstream/left sections 16c, 16d. The platform frame sections 16a–d have generally Z-shaped cross-sectional configurations with vertical webs 18a, outwardly-extending upper flanges 18b and inwardly-extending lower flanges 18c. At respective corners 20 of the platform frame 14 the upper ends of respective legs 10 can be fastened to the frame section webs 18a by suitable fastening means, such as the screws 22a, nuts 22b and washers 22c shown in FIG. 3. The base members 12 mount pairs of swiveling, locking castors 24. A motor/fan mounting subassembly 28 is mounted on the legs 10 at the welding station left, downstream side 26d.

III. Exhaust System 6

The exhaust system 6 includes filter means 30 comprising a sheet metal cabinet 32 with a bottom panel 34a, a right/upstream panel 34b, a front panel 34c and a back panel 34d. A truncated funnel 36 is mounted on a left or downstream side of the cabinet 32 and diverges to an exhaust outlet opening 38. Filter retaining means 40 is mounted within the interior of the cabinet 32 and includes an upstream crosspiece 42 connected to an upstream filter frame 44 extending across the cabinet panels 34a–c. An intermediate crosspiece 46 extends between the cabinet panels 34c and 34d and is connected to an intermediate filter frame 48. A downstream filter frame 50 is mounted in spaced relation downstream (i.e., to the left) of the intermediate crosspiece 46.

The filter frames 44, 48 and 50 have generally U-shaped configurations and extend across the cabinet panels 34a–c and terminate at a cabinet upper edge 52 forming a cabinet open top 54. The intermediate and downstream filter frames 48 can be formed of channel sections including connecting webs 56 attached to the cabinet panels 34a, 34c and 34d and parallel pairs of frame flanges 58 projecting inwardly into the interior of the cabinet 32. The filter frames 44, 48, 50 and the cross pieces 42, 46 collectively form the filter retaining means 40 and provide first, second, third and fourth filter receivers 60a, 60b, 60c and 60d in order from upstream (right) to downstream (left).

Filter receivers 60a, 60b can receive steel mesh filters 62a, 62b. Filter receiver 60c receives a filter 62c with a fibrous pad, which can comprise Dycon filter media. A pocket-type or bag-type filter 62d is received in the filter receiver 60d and includes multiple, juxtaposed pockets 64 which are open in an upstream direction, closed in a downstream direction and extend generally downstream within the cabinet 32 interior. The pockets 64 can comprise a suitable fibrous or cloth-type filter media. Preferably the media of the upstream filter 62a is coarsest and the filter media of the downstream filter 62d is finest for successive filtering stages in operation. Moreover, the steel mesh media of the upstream filters 62a, 62b is preferably resistant to welding sparks.

A downstream crosspiece 66 extends between the cabinet panels 34c, 34d and projects upwardly from the cabinet open top 54. A motor/fan unit 68 is mounted on the motor/fan mounting assembly 28 and includes a squirrel cage-type fan 70 communicating with the exhaust outlet opening 38 and driven by a suitable prime mover 72, such as an AC electrical motor. An on/off switch 74 is mounted on a frame leg 10 and selectively energizes the motor 72 by connecting same with a suitable electrical power source (not shown).

The cabinet 32 includes a removable top cover 76 including a panel 78 and a perimeter lip 80. Gasket material strips 82 are placed adjacent to the perimeter lip 80 on a lower surface of the panel 78 and across the panel 78 from front-to-back at a location over the intermediate cross piece 46. The cabinet upper edge 52 protrudes upwardly between the upstream and downstream cross pieces 42, 66 for engagement with the gasket strips 82. The intermediate/filter cross piece 46 also engages a gasket strip 82 whereby upstream, intermediate and downstream chambers 84a, 84b and 84c are formed in the interior of the cabinet 32. The filter cabinet upstream chamber 84a is open upwardly to receive exhaust gas from welding operations on the work area assembly 8.

The cabinet 32 includes a cabinet flange 86 which rests on the platform frame lower flange 18c. Upstream and downstream cabinet angle members 88a, 88b are connected to the upstream and downstream crosspieces 42, 66 respectively and mount hold-down mechanisms 90 for the filter cabinet cover 76. Each hold-down mechanism includes a J-bolt 92 extending through a respective cabinet angle member 88a, 88b and mounting a nut 94, washer 96 and compression spring 98 therebelow for biasing the J-bolt downwardly. A retaining nut 94 is mounted on the J-bolt 92 above the angle member 88a, 88b. The hold-down mechanisms 90 (e.g., four are shown at respective corners of the cabinet cover 76) secure the cover 76 on top of the cabinet 32 and can be rotated to release the cover 76 for accessing the filter means 30.

IV. Work Area Assembly 8

The work area assembly 8 includes a work surface 102 which can be formed from sheet metal and includes a horizontal panel 104, a downturned work surface lip 106 adapted to overlap the platform frame upper flange 18b at the welding station front 26a and a plurality of slot perforations 108 formed in the panel 104. The panel 104 is hingedly mounted on the platform frame upper flange 18b at the welding station back 26b by suitable hinges 110 and mounts a handle 112 at its front lip 106. An L-bracket 114 is mounted on the panel 104 in proximity to a right/upstream rear corner thereof and is adapted for grounding the work panel 104 by means of a grounding cable 130 terminating at and conducting electrical current through a clamp 128 (FIG. 1) for use in electrical welding operations. However, the welding station 2 is adapted for use in other types of procedures, particularly those which generate smoke and exhaust, and which can include other forms of welding. The panel 104 includes a plurality of shield pin receivers 116.

A welding shield subassembly 118 includes a rear panel 120a, a right/upstream panel 120b and a left/downstream panel 120c, each having a lower lip 122 adapted to rest on the panel 104. The panels 120a–c can be selectively secured together by panel connecting clips 124 which receive panel retaining pins 126. The welding shield subassembly 118 can be movably positioned on the work panel 104 by means of a plurality of shield mounting pins 132 each attached to a respective side panel 120b, 120c and depending downwardly therefrom for receipt in a respective shield pin receiver 116.

It is to be understood that while certain forms of the present invention have been illustrated and described herein, it is not to be limited to the specific forms or arrangement of parts described and shown.

What is claimed and desired to be secured by Letters Patent is as follows:

1. A self-exhausting welding station, which includes:
 (a) a frame assembly having:
  (1) four legs each having upper and lower ends;
  (2) a pair of base members each extending between a respective pair of leg lower ends at a respective side of said frame assembly;

(3) a platform frame having a generally rectangular configuration with front, back, first side and second side sections, said platform frame being mounted on said leg upper ends;
(4) said platform frame having a cross-sectional configuration with a web, an outwardly-extending upper flange and an inwardly-extending lower flange;
(5) a plurality of castors mounted on said base members; and
(6) a motor/fan mounting subassembly mounted on said frame at a downstream side of said frame assembly;

(b) an exhaust system including:
(1) a filter cabinet with bottom, upstream side, front and back panels;
(2) said filter cabinet being upwardly open;
(3) said filter cabinet having a downstream side and forming a truncated funnel with an outlet opening thereat;
(4) an upstream cross piece extending between said filter cabinet front and back panels;
(5) an intermediate cross piece extending between said filter cabinet front and back panels;
(6) a downstream cross piece extending between said filter cabinet front and back panels;
(7) upstream, intermediate and downstream filter frames extending between said filter cabinet front and back panels;
(8) said filter cabinet having an upper edge projecting upwardly above a level of said platform frame upper flanges;
(9) said filter cabinet having a cabinet flange extending outwardly therefrom and resting on said platform frame lower flanges;
(10) upstream, first intermediate, second intermediate and downstream filter receivers formed by said cross pieces and said filter frames;
(11) upstream and first intermediate steel mesh filters mounted in said upstream and first intermediate filter receivers respectively;
(12) a second intermediate filter including a fibrous pad mounted within said second intermediate filter receiver;
(13) a bag filter with multiple, juxtaposed pockets each open in an upstream direction and closed in a downstream direction mounted in said downstream filter receiver;
(14) a filter cabinet cover including a panel, a filter lip and gasket means mounted on an underside of said panel, said cover being selectively mounted on top of said filter cabinet for enclosing intermediate and downstream chambers thereof;
(15) said filter cabinet having an upwardly-open upstream chamber, an intermediate/filter chamber receiving said filters and a downstream chamber terminating at said filter cabinet downstream end;
(16) a fan mounted on said cabinet downstream end and communicating therewith; and
(17) a motor drivingly connected to said fan;

(c) a work area assembly including:
(1) a work surface with a panel having multiple slot perforations therein and a lip depending downwardly therefrom along a front edge thereof; said panel being hingedly mounted to said platform frame back section;
(2) a plurality of receivers formed in said work surface panel;
(3) a welding shield subassembly including rear, upstream side and downstream side panels selectively interconnected by panel retaining clips and panel retaining pins;
(4) a plurality of welding shield mounting pins each extending downwardly from said welding shield subassembly and receivable in a respective work surface panel receiver; and
(5) a grounding bracket mounted on said work surface panel and depending downwardly therefrom for electrically grounding same.

\* \* \* \* \*